March 7, 1967     O. E. BERG ETAL     3,307,407

MICRO-PARTICLE IMPACT SENSING APPARATUS

Filed July 30, 1964

INVENTOR.
OTTO E. BERG
W. MERLE ALEXANDER

BY

ATTORNEYS

United States Patent Office

3,307,407
Patented Mar. 7, 1967

3,307,407
MICRO-PARTICLE IMPACT SENSING APPARATUS
Otto E. Berg, Washington, D.C., and Wesley Merle Alexander, Silver Spring, Md., assignor to the United States of America as represented by the Administrator of the National Aeronautics and Space Administration
Filed July 30, 1964, Ser. No. 386,462
7 Claims. (Cl. 73—432)

The invention described herein may be manufactured and used by or for the Government of the United States of America for governmental purposes without the payment of any royalties thereon or therefor.

This invention relates generally to particle sensors, and more particularly to detection apparatus for indicating the frequency of incident and the relative energy of hypervelocity, micro-particles in interplanetary space.

It is known that minute particles, such as dust particles and micro-meteorites, from an important constituent of interplanetary space. Information as to selected parameters such as spacial density, mass and velocity of such particles is of great interest in space exploration. In addition to its theoretical scientific value, such information is of great practical value in design considerations for the skin of spacecraft in order to protect instruments and/or occupants from the effects of collision with micro-meteorites and the like. Further, information derived concerning the parameters of dust particles and micro-meteorites may provide, by extrapolation, important conclusions as to the meteoroid hazard in interplanetary space travel.

Known prior art micro-particle collision detection devices include microphone systems, photomultipliers, and rocket collection systems. Such systems are discussed in a paper entitled, "Review of Direct Measurements of Interplanetary Dust From Satellites and Probes," by W. M. Alexander et al., presented and published at the International Astronomical Congress, 1962.

Further known micro-particle collision detection devices include a closely spaced wire grid wrapped around a spacecraft, with counting apparatus arranged to provide an indication when a particle severs the grid at the point of impact; and capacitor discharge detectors of the type set forth in Patent No. 3,004,735 by W. H. Kinard, assigned to the United States Government as represented by the Administrator of the National Aeronautics and Space Administration. Briefly, this latter type of detector utilizes a dielectric layer (such as "Mylar") disposed between two thin conductive plates. A potential is applied across the plates and a particle of sufficient energy to penetrate one plate and the dielectric layer produces a localized ionization phenomena to cause a momentary short circuit that discharges the charge build up across the plates. Suitable recording apparatus and/or a telemetry transmitter is utilized to prove an indication of particle impact.

Because of inherent simplicity and reliability, capacitor discharge type micro-particle collision detectors are particularly suitable for space exploration. However, successful operation of the particle detector of the type set forth in the above mentioned patent depends upon penetration of at least one conductive plate and the dielectric layer, and a particle that only partially penetrates the dielectric layer will not produce a measurable response. This in turn limits the sensitivity of the detector and the incidence of relatively low energy particles will not be recorded. Further, and in order to differentiate between particles of different energy levels, a multi-layer capacitor arrangement must be used such that an indication of different energy levels is determined as successive layers of the capacitor are penetrated. This adds to the size and complexity of the sensor and associated recording apparatus. In addition, an organic dielectric material (such as "Mylar") is not self-recuperative, that is, the dielectric layer may leave a charred, conductive path where perforated. Thus, in order to provide satisfactory statistical data it is necessary to use a surface area of several hundred square feet, resulting in an increase in size and complexity of the vehicle required to carry out the measurement.

Accordingly, it is among the objects of the present invention to provide novel and improved apparatus for detecting hypervelocity micro particles in interplanetary space.

Another object of the present invention is to provide a simple and compact micro-particle collision detector of the capacitor discharge type, having increased sensitivity for aerospace research.

Still another object of the invention is to provide a new and improved capacitor discharge type micro-particle collision sensor which does not require penetration of the dielectric layer to produce an adequate electrical response, thereby increasing sensitivity to relatively low energy particles, and which is self-recuperative to thereby result in a substantially reduced target area for an adequate statistical sampling of data.

A further object of the invention is to provide a novel and improved capacitor discharge type interplanetary dust particle detector in which a single layer capacitor and a simple circuit arrangement will readily provide a response indicative of total particle energy.

Other objects, as well as the features and attending advantages of the invention, will become apparent from the following description when taken in conjunction with the accompanying drawings, in which.

According to the present invention the foregoing and other objects are obtained by the provision of a non-conducting metallic oxide layer disposed between two conductive surfaces, at least one surface being a thin conductive film to provide a target area for impinging micro-particles. Preferably, although not limiting, the oxide layer may be silicon oxide and/or aluminum oxide. The conductive surfaces form the plates of the capacitor and are connected across a potential source through a sensing resistor. A recording device and suitable telemetry apparatus is connected to the sensing resistor. An impinging hypervelocity microparticle induces a shock wave which is propagated through the oxide layer and produces localized heating therein that momentarily decreases the resistivity of the layer in proportion to the intensity of the shock wave. This in turn results in a discharge of the charge across the capacitor to produce an electrical signal across the sensing resistor having an amplitude which is a function of the kinetic energy (mass and velocity) of the impinging particle. It is not required, in order to produce a measurable response, that the particle penetrate the target area and/or the oxide layer, and calibration of the recording device allows a differentiation of the relative kinetic energy levels of the impinging particles.

Figure 1:
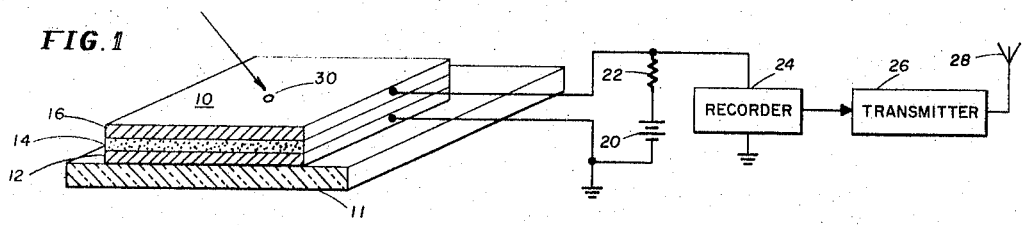
FIGURE 1 is a simplified schematic representation of the particle detection apparatus of the invention.

Referring now specifically to the drawings, the particle detection apparatus of FIGURE 1 includes sensor 10 mounted on a suitable base plate 11, which may be of insulating material such as glass. A thin surface of conductive material 12 is deposited on one side of base plate 11. A thin layer of a non-conducting metallic oxide 14 is deposited on conductive surface 12, and a target area 16 (also of conductive matreial) is deposited on oxide layer 14. Base plate 11, of suitable thickness to provide rigidity, is for structural purposes only and does not enter into the operation of the apparatus of the invention. Conductive surface 12, target area 16 and oxide layer 14 (all greatly exaggerated in thickness for purposes of illustration) may be thin vapor deposited films. Alternately, conductive surface 12 may be a thin metallic sheet that is self-supporting (base plate 11 not being used), with oxide layer 14 and target area 16 deposited thereon. Accordingly, conductive surface 12 and target area 16 form the plates of a capacitor, with non-conducting metallic oxide layer 14 providing the dielectric of the capacitor.

A potential is applied across the capacitor so formed by battery 20. To this end one side of battery 20 is connected, through sensing resistor 22, to target area 16, and the other side of battery 20 is connected directly to conductive surface 12. The common point of battery 20 and conductive surface 12 is returned to a reference potential such as ground. A conventional electro-responsive recorder 24 is coupled between the side of resistor 22 common to target area 16 and the reference potential. A telemetry transmitter 26 may be connected to recorder 24 to transmit information thereby recorded to a remote receiving station via antenna 28.

As mentioned, both conductive surface 12 and target area 16 may be an aluminum film, applied by conventional metal depositing techniques, or conductive surface 12 may be a thin metallic sheet that is self-supporting. The thickness is not critical and may range from several thousand angstroms to seevral thousandths of an inch thick. Where conductive layer 12 is self-supporting, mounting tabs may extend from its marginal edges to be secured to a suitable mounting frame. In this instance an impinging particle will pass through sensor 10 with an insignificant loss of energy. This arrangement is preferable where further accurate velocity measurements of the impinging particle are to be carried out.

Although oxide layer 14 may be any non-conductive metallic oxide, good results are obtained by using silicon oxide ($S_iO_x$) and/or aluminum oxide ($Al_2O_3$). The silicon oxide may, for example, be applied by evaporating silicon on an aluminum layer in an oxygen atmosphere, and includes silicon monoxide ($S_iO$), silicon dioxide ($S_iO_2$) and silicon trioxide ($S_iO_3$). The exact composition is not critical since the various oxides thereby formed will provide an excellent insulator under normal conditions, and as subsequently discussed, will provide decreased resistivity when locally heated as a result of pressure waves generated by an impinging hypervelocity micro-particles.

The non-conductive metallic oxide layer 14 should be sufficiently thick to insure against pin holes which may become filled with metal to result in short circuits. Satisfactory results, when used in conjunction with a ten volt battery, have been attained with oxide layer 14 in the order of 5,000 ±2,000 angstroms thick. After fabrication, an over-voltage (30–40 volts) may be applied between conductive surface 12 and target area 16 to burn away any short circuits that may be present.

Figure 3:
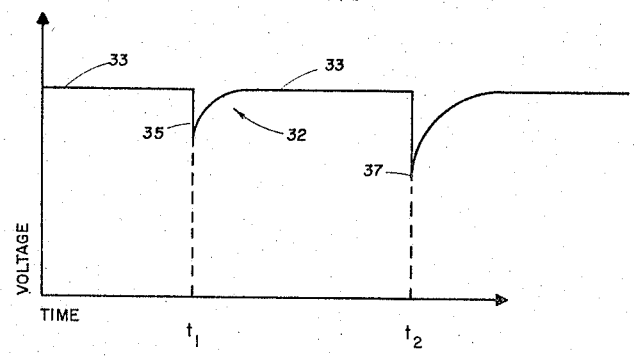
FIGURE 3 is a graphical representation of the electrical response produced by the micro-particle collision detector of the invention.
Figure 2:
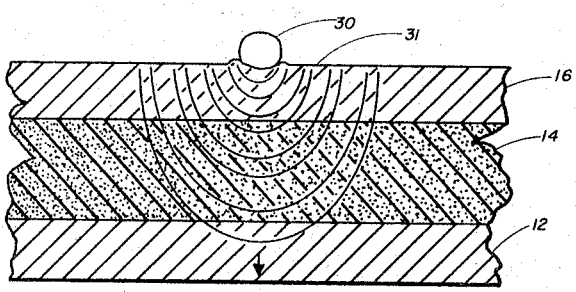
FIGURE 2 is an exploded cross-sectional view illustrating the pressure waves induced in the capacitor sensor of the invention as the result of hypervelocity micro-particles colliding therewith.

Operation of the described system may be best understood with reference to FIGURES 2 and 3. Assume an initial condition wherein the capacitor formed by conductive surface 12, target area 16 and oxide layer 14 is charged through resistor 22 to the voltage of battery 20. There is, under this condition, a potential equivalent to the battery voltage appearing at the junction of resistor 22 and target area 16. An impinging micro-particle 30 that strikes target area 16 at hypervelocity produces a highly intense shock wave in its immediate vicinity. This shock wave is representatively shown in FIGURE 2 by equal pressure lines 31. It is to be understood that particle 30 may or may not continue to pass through sensor 10 subsequent to initial impact, an important fact being that complete penetration of oxide layer 14 is not necessary for a measurable response. As the shock wave propagates through target area 16 and into oxide layer 14 intense localized heating takes place. As the oxide becomes heated its resistivity momentarily decreases, and subsequently returns to its initial high resistivity value after the wave is dissipated. As a result, the signal illustrated by waveform 32 of FIGURE 3 is developed across resistor 22 and applied to recorder 24, and may be transmitted by telemetry transmitter 26 and antenna 28 to a remote receiving point.

With particular reference to waveform 32, portion 33 (indicating a quiescent or ready condition) is displaced from a reference axis by an amount determined by the voltage of battery 20. An impinging particle (at time $t_1$) momentarily reduces the resistance of oxide layer 14 to discharge capacitor almost instantaneously, thereby producing a voltage drop across resistor 22, as shown by portion 35 of waveform 32. Subsequently the waveform returns to reference level 33 in a time determined by the time constant of the recording system. A second impinging particle (at time $t_2$) produces a second indication, as illustrated by portion 37 of waveform 32. It may be noted that the successive indications of particle collisions are not necessarily equal in amplitude. This is so because the shock waves induced in oxide layer 14, and hence the resulting decrease in resistivity depends on the relative kinetic energy level of the impinging particle (that is, its mass and velocity). Accordingly, the signal applied to recorder 24 may be suitably calibrated to provide an indication of the relative energy level of individual impinging particles, each readily distinguishable from the other.

Since the intense heating of oxide layer 14 does not materially alter its chemical composition, it will return to its normally high impedance state subsequent to impact of the particle. In addition, a particle that passes through oxide layer 14 does not leave a charred, conductive path that may reduce its resistivity, and the effect on available surface area is imperceptible. Thus the sensor 10 is self-recuperative and adequate statistical sampling of data may be obtained from a device having a relatively small target area. For example, sensor 10 (as illustrated in FIGURE 1) may provide a target area in the order of one inch square or less. Sensors having a larger target area (in the order of one foot square or greater) and having target areas on both sides, may also be used, as shown in FIGURE 4.

Figure 4:
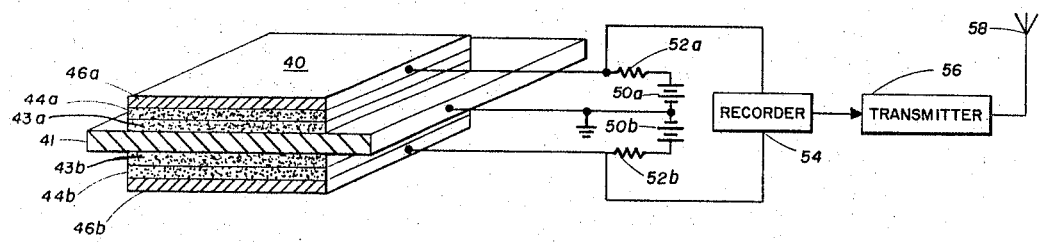
FIGURE 4 is a simplified schematic representation of a further embodiment of the invention.

Referring to FIGURE 4 in more detail, sensor 40 includes a large area aluminum base plate 41. Layers 43a and 43b of aluminum oxide are disposed on both sides of base plate 41. This aluminum oxide layer aids in the sealing of the peaks and valleys of surfaces of aluminum base plate 41. Layers 44a and 44b of silicon oxide are then deposited on aluminum oxide layers 43a and 43b, respectively. The sensor 40 is completed by depositing aluminum target areas 46a and 46b on silicon oxide layers 44a and 44b, respectively.

The detection apparatus of FIGURE 4 further includes battery 50a and sensing resistor 52a connected in series between base plate 41 and target area 46a. Similarily, battery 50b and resistor 52b are connected between base plate 41 and target area 46b. The input for recorder 54 is derived from the junction of resistors 52a and 52b and target areas 46a and 46b, respectively. The information so recorded may, in turn, be transmitted to a remote receiving station by transmitter 56 and antenna 58. Overall operation of the system of FIGURE 4 is the same as that of FIGURE 1, producing a response of the type shown in FIGURE 3 as a result of particles impinging on the target area of either side of sensor 40.

The invention provides, therefore, new and improved detection apparatus for indicating the frequency of incident and the relative energy of hypervelocity microparticles in interplanetary space. Its simplicity and compactness of construction and reliability of operation make it particularly suitable for aerospace research. The novel sensor of the detection apparatus results in increased sensitivity for the detection of relatively low velocity particles, and produces an electrical response that is proportional in amplitude to particle energy, thus allowing calibration for an indication of relative mass and velocity of an impinging particle.

Although the invention has been set forth with particularity, it should be readily apparent to those skilled in the art that modifications and variations are possible. It is therefore to be understood that the invention may be practiced other than specifically described.

What is claimed as new and desired to be secured by Letters Patent of the United States is:

1. Apparatus for detecting the relative kinetic energy levels of impinging micrometeorites, said apparatus consisting of a conductive surface, a thin film of normally non-conducting metallic oxide deposited on said conductive surface, a target area comprising a thin film of conductive material deposited on said metallic oxide film opposite to said conductive surface, said metallic oxide film characterized in that it momentarily provides increased conductivity in areas locally heated as a result of pressure waves generated by micrometeorites impinging on said target area, and circuit means for applying an electrical potential between said conductive surface and said target area and responsive to potential variations resulting from said momentarily increased conductivity, the relative amplitude of said potential variations being indicative of the relative kinetic energy of impinging micrometeorites.

2. The apparatus of claim 1 wherein said conductive surface and said target area are aluminum.

3. The apparatus of claim 1 wherein said oxide film is silicon oxide.

4. The apparatus of claim 1 wherein said oxide film is aluminum oxide.

5. Apparatus for detecting the relative kinetic energy levels of impinging micrometeorites, said apparatus consisting of a base member of conductive material having a plurality of flat surfaces, a thin film of normally non-conducting metallic oxide deposited on each flat surface, a target area comprising a thin film of conductive material deposited on each said metallic oxide film opposite to said flat surfaces, said metallic oxide film characterized in that it momentarily provides increased conductivity in areas locally heated as a result of pressure waves generated by micrometeorites impinging on said target areas, and circuit means for applying an electrical potential between said base member and said target areas and responsive to potential variations resulting from said momentarily increased conductivity, the relative amplitude of said potential variations being indicative of the relative kinetic energy levels of impinging micrometeorites.

6. The apparatus of claim 5 wherein said metallic oxide films are silicon oxide.

7. The apparatus of claim 6 wherein said base member is aluminum, and further including a film of aluminum oxide deposited between said flat surfaces and said silicon oxide films.

References Cited by the Examiner

UNITED STATES PATENTS 2,408,910  10/1946  Burnham _____ 317—258
3,004,735  10/1961  Kinard.
3,159,029  12/1964  Ruderman.

OTHER REFERENCES

Aerospace Engineering, February, 1962, pages 29, 30.

DAVID SCHONBERG, *Primary Examiner.*